Figure 1:
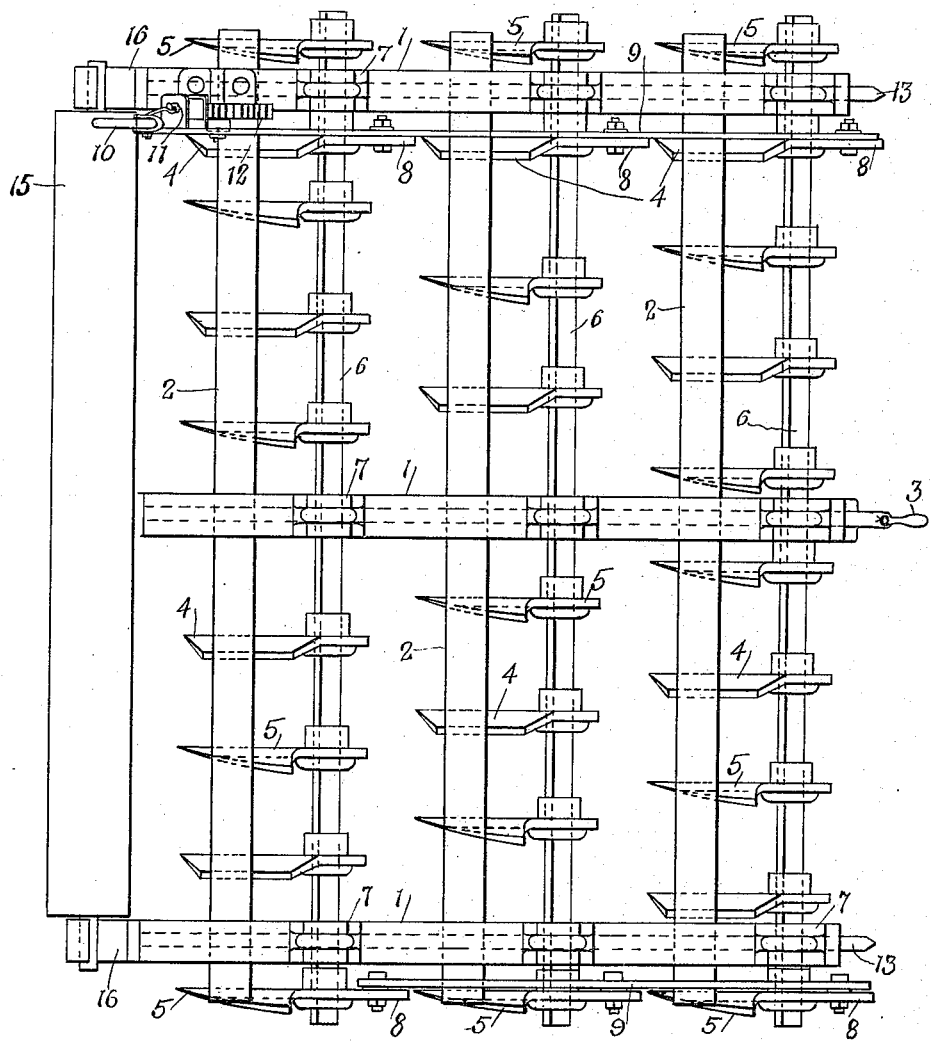

F. BALDWIN.
SOIL PULVERIZER.
APPLICATION FILED APR. 29, 1914.

1,156,873.

Patented Oct. 19, 1915.
2 SHEETS—SHEET 1.

Witnesses
Howard Walmsley.
H. L. Hammaker.

Inventor
Ferdinand Baldwin,

By
Toulmin Reed & Toulmin
Attorneys

F. BALDWIN.
SOIL PULVERIZER.
APPLICATION FILED APR. 29, 1914.
1,156,873.
Patented Oct. 19, 1915.
2 SHEETS—SHEET 2.
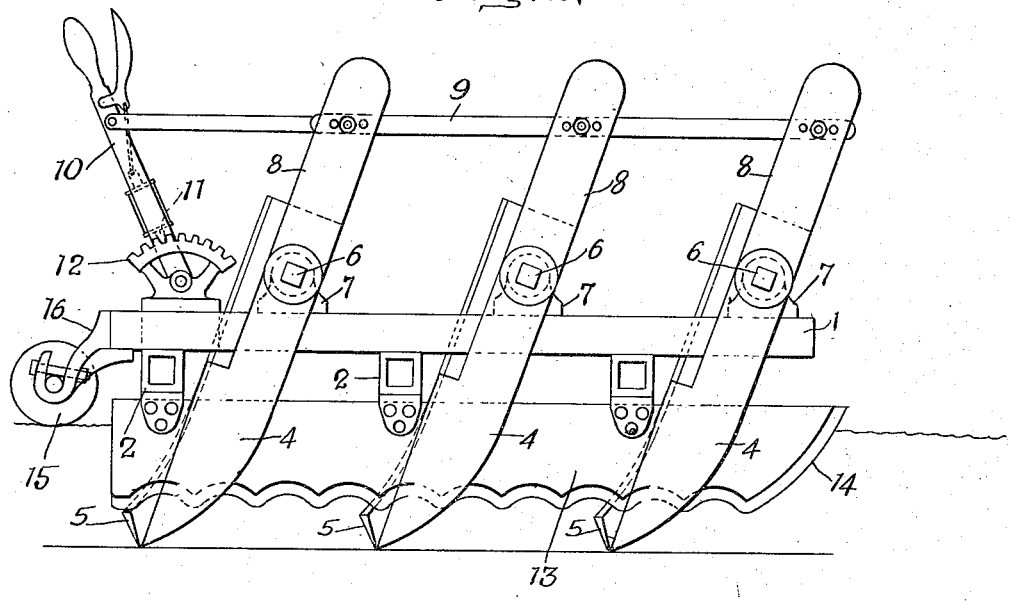
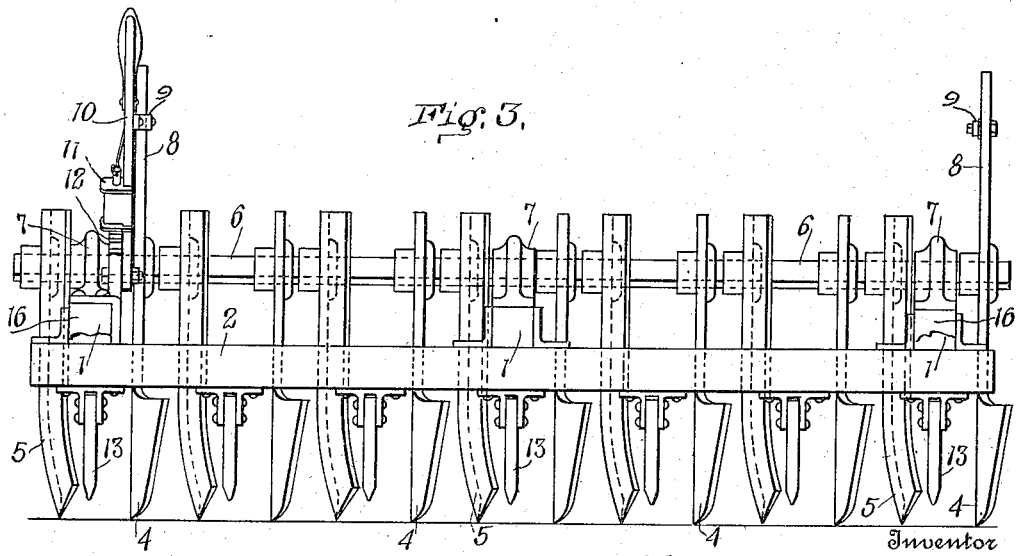
Witnesses
Howard Walmsley
H. L. Hammaker
Inventor
Ferdinand Baldwin,
By Toulmin Redd & Toulmin
Attorneys

UNITED STATES PATENT OFFICE.

FERDINAND BALDWIN, OF NEAR NORTH HAMPTON, OHIO, ASSIGNOR OF ONE-HALF TO HORACE L. HEISTAND, OF CLARK COUNTY, OHIO.

SOIL-PULVERIZER.

1,156,873.   Specification of Letters Patent.   Patented Oct. 19, 1915.

Application filed April 29, 1914. Serial No. 835,326.

*To all whom it may concern:*

Be it known that I, FERDINAND BALDWIN, a citizen of the United States, residing near North Hampton, in the county of Clark and State of Ohio, have invented certain new and useful Improvements in Soil-Pulverizers, of which the following is a specification, reference being had therein to the accompanying drawing.

This invention relates to soil pulverizers and the object of the invention is to provide an earth breaking implement which, by a single operation, will prepare the soil for planting, thereby eliminating one of the two usual operations, it being necessary ordinarily to both plow and harrow the ground. To accomplish this I provide the implement with a series of inclined blades arranged transversely thereof and adjustable to vary their inclination; and further, I provide horizontal blades arranged between the vertical blades and adapted to enter the ground and to cut such stalks, straw or trash of any kind as may lie upon or just beneath the surface of the ground.

The device is designed especially for use in preparing fields where the soil is fairly loose, such as a corn field after the corn has been cut, but its use is not limited to such fields.

In the accompanying drawings, Figure 1 is a plan view of an implement embodying my invention; Fig. 2 is a side elevation thereof; and Fig. 3 is a rear elevation thereof.

In these drawings, I have illustrated one embodiment of my invention and have shown the same as comprising a main frame having longitudinal members 1 connected by transverse members 2 and provided at its forward end with a clevis 3 to which the usual draft appliance may be connected. Mounted upon this frame are a plurality of series of earth-engaging blades, each series extending transversely to the line of movement of the implement.

The blades of each series are of two kinds but both extend substantially vertically. One set of blades, which are indicated at 4, are curved rearwardly from their cutting edge something after the manner of a plow share and have their rear portions projecting laterally to more effectually loosen and pulverize the soil. The second set of blades are indicated at 5 and are curved about a horizontal axis as well as about a vertical axis, thus serving to cause the points of the blades to project laterally to better pulverize and loosen the soil below the surface thereof. The blades are preferably adjustable so that the angle of their inclination to the surface of the ground may be varied and, to this end, I have rigidly secured the several blades to transverse shafts 6 which are journaled in bearings 7 on the frame members. One or more of the blades 4 of each series are arranged in alinement with the corresponding blades 4 of the other series and are provided with upwardly extending arms 8 by means of which they may be connected one to the other, this connection being formed, in the present instance, by means of longitudinal rods 9. One of these rods, here shown as the rod at one side of the implement, projects rearwardly and is connected with an actuating lever 10 which is provided with the usual spring-pressed dog 11 coöperating with the usual toothed segment 12 to lock the lever and, consequently, the blades in adjusted positions. The other blades of the several series are offset with relation one to the other so that the blades of the succeeding series will not follow in the paths of the corresponding blades of the preceding series, thus causing the whole surface of the ground over which the implement passes to be thoroughly broken up.

Mounted beneath the frame and arranged between the blades 4 and 5 are a series of substantially horizontal longitudinal blades 13 having their front and lower edges forming cutting edges, the front edges being inclined, as shown at 14. Preferably, the lower edges of these longitudinal blades are serrated. These blades are secured to the lower edges of the transverse frame members 2 and project into the ground for some distance, although preferably not to the full depth of the blades 4 and 5. Any stalks, straw or the like lying upon the surface of the ground or embedded just below the surface of the ground will be engaged by the forward inclined edges of the blades and cut either by these forward edges or the serrated edges if they should pass under the blade without being cut.

The operation of the device will be apparent and it will be understood that as the implement is dragged over the ground the several blades will sink into the soil for a considerable depth and as the machine is dragged forward the soil will be thoroughly broken up, the trash cut up and the ground put into a pulverized condition ready to receive the seed. Further, it will be noted that the vertical blades are all adjustable by the manipulation of the lever 10 to vary their inclination to accommodate it to working conditions and, if desired, to raise the blades to permit the implement to pass stones or the like. I have also provided the implement with a roller 15 removably mounted in brackets 16 secured to the rear portion of the frame. This roller being readily removed can be used or placed aside as may be desired.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

In an implement of the character described, a main frame, a plurality of transverse shafts mounted on said main frame, a series of blades carried by each of said shafts, a plurality of longitudinal blades mounted on said frame, extending lengthwise of said implement and arranged between the blades on said shafts, an operating lever, and means for connecting said operating lever with the several shafts to enable said blades to be simultaneously adjusted relatively to said longitudinal blades.

In testimony whereof, I affix my signature in presence of two witnesses.

FERDINAND BALDWIN.

Witnesses:
F. W. SCHAEFER,
EDWARD L. REED.

Copies of this patent may be obtained for five cents each, by addressing the "Commissioner of Patents, Washington, D. C."